(12) United States Patent
Hasegawa et al.

(10) Patent No.: US 8,731,312 B2
(45) Date of Patent: May 20, 2014

(54) IMAGE CODING APPARATUS

(75) Inventors: Hiromu Hasegawa, Osaka (JP); Toshimitsu Tatsuka, Osaka (JP)

(73) Assignee: MegaChips Corporation, Osaka-shi (JP)

(*) Notice: Subject to any disclaimer, the term of this patent is extended or adjusted under 35 U.S.C. 154(b) by 83 days.

(21) Appl. No.: 13/582,056

(22) PCT Filed: Feb. 24, 2011

(86) PCT No.: PCT/JP2011/054081
§ 371 (c)(1), (2), (4) Date: Aug. 31, 2012

(87) PCT Pub. No.: WO2011/108427
PCT Pub. Date: Sep. 9, 2011

(65) Prior Publication Data
US 2012/0321207 A1    Dec. 20, 2012

(30) Foreign Application Priority Data
Mar. 4, 2010   (JP) ................... 2010-048087

(51) Int. Cl.
*G06K 9/36*   (2006.01)
*G06K 9/46*   (2006.01)
*H04N 7/26*   (2006.01)

(52) U.S. Cl.
CPC ..... *H04N 19/0003* (2013.01); *H04N 19/00278* (2013.01)
USPC .......................................... 382/238; 382/232

(58) Field of Classification Search
None
See application file for complete search history.

(56) References Cited

U.S. PATENT DOCUMENTS

| | | | |
|---|---|---|---|
| 7,020,203 B1 | 3/2006 | Horowitz et al. | |
| 2007/0014360 A1 | 1/2007 | Botzko et al. | |
| 2009/0046092 A1* | 2/2009 | Sato et al. | 345/418 |

(Continued)

FOREIGN PATENT DOCUMENTS

| | | |
|---|---|---|
| JP | 6 98295 | 4/1994 |
| JP | 2001 186523 | 7/2001 |
| JP | 2004 215252 | 7/2004 |
| JP | 2007 28617 | 2/2007 |

OTHER PUBLICATIONS

Zhang, Rui, Shankar L. Regunathan, and Kenneth Rose. "Video coding with optimal inter/intra-mode switching for packet loss resilience." Selected Areas in Communications, IEEE Journal on 18.6 (2000): 966-976.*

(Continued)

*Primary Examiner* — Li Liu
(74) *Attorney, Agent, or Firm* — Oblon, Spivak, McClelland, Maier & Neustadt, L.L.P.

(57) ABSTRACT

It is an object of the present invention to provide an image coding technique for suppressing degradation in image quality, in which the time and space where intra macroblocks appear are dispersed. A numerical value (Ftk) is generated from the lower-order six bits of the frame number (Ft) of a coding object frame. A numerical value (Fs) is generated by shifting the numerical value (Ftk) leftward by two bits. An exclusive OR of the numerical value (Ftk) and the numerical value (Fs) is calculated, to thereby generate a numerical value (A). A numerical value (Ytk) is generated from the lower-order six bits of the Y coordinate (Yt) of a coding object macroblock. The upper-order bits of the numerical value (Ytk) and the lower-order bits thereof are inverted, to thereby generate a numerical value (Yr). Further, an exclusive OR of the numerical value (Yr) and the numerical value (A) is calculated, to thereby generate a numerical value (B). A numerical value (Xtk) is generated from the lower-order six bits of the X coordinate (Xt) of the coding object macroblock. When the numerical value (Xtk) and the numerical value (B) are identical to each other, the coding object macroblock is intra-coded.

15 Claims, 5 Drawing Sheets

(56) References Cited

U.S. PATENT DOCUMENTS

| | | | | |
|---|---|---|---|---|
| 2009/0279603 | A1* | 11/2009 | Chen et al. | 375/240.02 |
| 2010/0166069 | A1* | 7/2010 | Goel | 375/240.13 |
| 2012/0002724 | A1* | 1/2012 | Klim | 375/240.03 |

OTHER PUBLICATIONS

Wiegand, Thomas, et al. "Overview of the H. 264/AVC video coding standard." Circuits and Systems for Video Technology, IEEE Transactions on 13.7 (2003): 560-576.*

Technical Guie for MPEG technologies in the homepage of Pioneer Corporation, Total 6 pages, (Dec. 10, 2009) (with English translation).

Reference Room in the homepage of Japan Patent Office, Total 16 pages, (Dec. 10, 2009) (with English translation).

International Search Report Issued Mar. 29, 2011 in PCT/JP11/054081 Filed Feb. 24, 2011.

U.S. Appl. No. 13/575,373, filed Jul. 26, 2012, Hasegawa, et al.

* cited by examiner

Ftk···000 001 010 011 100 101 110 111 (01234567)
Fs···000 010 100 110 000 010 100 110
A ···000 011 110 101 100 111 010 001 (03654721)

IMAGE CODING APPARATUS

TECHNICAL FIELD

The present invention relates to an apparatus for coding images to generate compressed images, and more particularly to an apparatus which uses an intra coding process and an inter coding process to code images.

BACKGROUND ART

In image coding techniques such as MPEG2, H.264, and the like, an intra coding process and an inter coding process are used. In the intra coding process, coding is completed within a frame to be coded, without using any reference frame. In the inter coding process, coding for a frame to be coded is performed by using one or more reference frames.

All macroblocks included in an I picture are coded by the intra coding process. Macroblocks included in a P picture and a B picture are coded by the inter coding process. Since all the macroblocks in the I picture are intra-coded, the amount of generated codes in the I picture is larger than that in the P picture or the B picture. Even in the H.264 where an intra prediction technique is used, the amount of generated codes in the I picture is still larger than that in the P picture or the B picture.

In a system in which low-delay reproduction or transmission is required, an increase in the amount of generated codes in the I picture becomes a problem. Further, there is another problem that the amount of generated codes oscillates in a cycle of appearance of the I picture. When the amount of generated codes oscillates, a larger buffer size is temporarily needed, which is inefficient.

PRIOR-ART DOCUMENTS

Patent Documents

[Patent Document 1] Japanese Patent Application Laid Open Gazette No. 2004-215252

[Non-Patent Document 1] Technical Guide for MPEG technologies in the homepage of Pioneer Corporation, searched on Dec. 10, 2009, <URL:http://pioneer.jp/crdl/tech/mpeg/3-2.html>

[Non-Patent Document 2] Reference Room in the homepage of Japan Patent Office, searched on Dec. 10, 2009, <URL: http://www.jpo.go.jp/shiryou/s_sonota/hyoujun_gijutsu/nle/nle-7-1.html>

As discussed above, a compressed image data including an I picture in which all macroblocks in a frame are intra-coded is not appropriate for a low-delay system since there is a possibility of causing a delay in the processing of the I picture. Then, proposed is a coding method shown in Non-Patent Document 1.

In Non-Patent Document 1, no I picture in which all macroblocks in a frame are intra-coded is used. In Non-Patent Document 1, intra macroblocks are arranged on a slice-by-slice basis. All macroblocks in a slice within a frame are coded as intra macroblocks to be directly subjected to DCT without using any prediction. Such a slice is termed an "intraslice". By shifting a place to which the intraslice is applied on a frame-by-frame basis, the intraslice makes the rounds of the whole screen in a certain cycle and the screen is thereby refreshed. Since the amount of generated codes required for the intraslice is smaller than that required for the I picture, it is possible to reduce the buffer size and decrease the delay.

Also in Non-Patent Document 2, similarly, disclosed is a technique using the intraslice.

As disclosed in Non-Patent Documents 1 and 2, with the intraslice, it is possible to disperse intrablocks in a GOP (Group of Pictures).

However, since all the macroblocks in a slice are intra-coded and the position of the intraslice is shifted by one row on a frame-by-frame basis, the method causes degradation in image quality. Specifically, when images are reproduced in series, the intraslices disadvantageously appear like scan lines.

In the above-discussed Patent Document 1, the intra macroblocks are dispersed on a macroblock-by-macroblock basis. Even in a case using the technique shown in Patent Document 1, since the intra macroblocks are moved at certain intervals, the positions of the intra macroblocks are disadvantageously noticeable.

DISCLOSURE OF INVENTION

The present invention is intended for an image coding apparatus. According to an aspect of the present invention, the image coding apparatus comprises a judgment part for judging whether a macroblock to be coded should be intra-coded or inter-coded so that all macroblocks are intra-coded once in N frame period and a coding part for coding the macroblock to be coded, on the basis of a determination result of the judgment part. In the image coding apparatus of the present invention, the judgment part includes a first conversion part for extracting the lower-order K bits of a numerical value J to thereby generate a numerical value L which can take a value of $2^K$ and converting the numerical value L into a numerical value M which can take a value of $2^K$, assuming that a frame number of a coding object frame including the macroblock to be coded in the N frame period is represented by a binary number as the numerical value J. The judgment part includes a second conversion part for extracting the lower-order K bits of a numerical value P to thereby generate a numerical value Q which can take a value of $2^K$ and converting the numerical value Q into a numerical value R which can take a value of $2^K$, assuming that the coordinate of the macroblock to be coded in a first direction in the coding object frame is represented by a binary number as the numerical value P. The judgment part includes a generation part for generating a numerical value S which is uniquely determined from a combination of the numerical value M and the numerical value R. Further, the judgment part includes a determination part for extracting the lower-order K bits of a numerical value T to thereby generate a numerical value U which can take a value of $2^K$ and determining the macroblock to be coded as an intra macroblock when the numerical value S and the numerical value U are identical to each other, assuming that the coordinate of the macroblock to be coded in a second direction orthogonal to the first direction in the coding object frame is represented by a binary number as the numerical value T.

By using the image coding apparatus of the present invention, the intra macroblocks are dispersed in a time direction. This technique is adaptable to a low-delay system. Further, it is possible to reduce the buffer size.

By using the image coding apparatus of the present invention, the intra macroblocks can be arranged at random in a spatial direction. The boundaries of the intra macroblocks thereby become unnoticeable and it is therefore possible to improve the image quality.

Therefore, it is an object of the present invention to provide an image coding technique for suppressing degradation in image quality, in which the time and space where the intra macroblocks appear are dispersed.

These and other objects, features, aspects and advantages of the present invention will become more apparent from the following detailed description of the present invention when taken in conjunction with the accompanying drawings.

BEST MODE FOR CARRYING OUT THE INVENTION

Hereinafter, with reference to figures, discussion will be made on image coding apparatuses of the preferred embodiments of the present invention.

{The First Preferred Embodiment}
<Constitution of Image Coding Apparatus>

Figure 1:
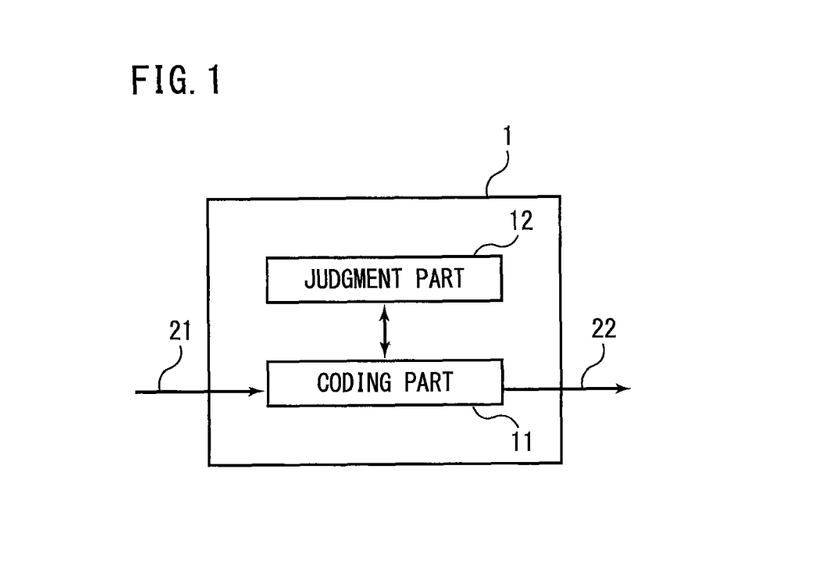
[FIG. 1] is a block diagram showing an image coding apparatus in accordance with preferred embodiments of the present invention.

FIG. 1 is a block diagram showing an image coding apparatus 1 in accordance with a first preferred embodiment. The image coding apparatus 1 comprises a coding part 11 and a judgment part 12.

The coding part 11 receives uncompressed image data 21. The coding part 11 performs an image coding process on the received uncompressed image data 21, to thereby output compressed image data 22. The coding part 11 performs the image coding process using a coding system such as MPEG2, H.264, or the like.

The judgment part 12 judges whether a macroblock to be coded should be intra-coded or inter-coded. The image coding apparatus 1 of the first preferred embodiment does not use any I picture in which all macroblocks are intra-coded. The image coding apparatus 1 of the first preferred embodiment arranges the intra macroblocks dispersedly in a time direction. The judgment part 12 arranges the intra macroblocks so that all the macroblocks in a frame image may be intra-coded once in a refresh period. A group of images in one refresh period corresponds to one GOP (Group of Pictures).

Figure 2:
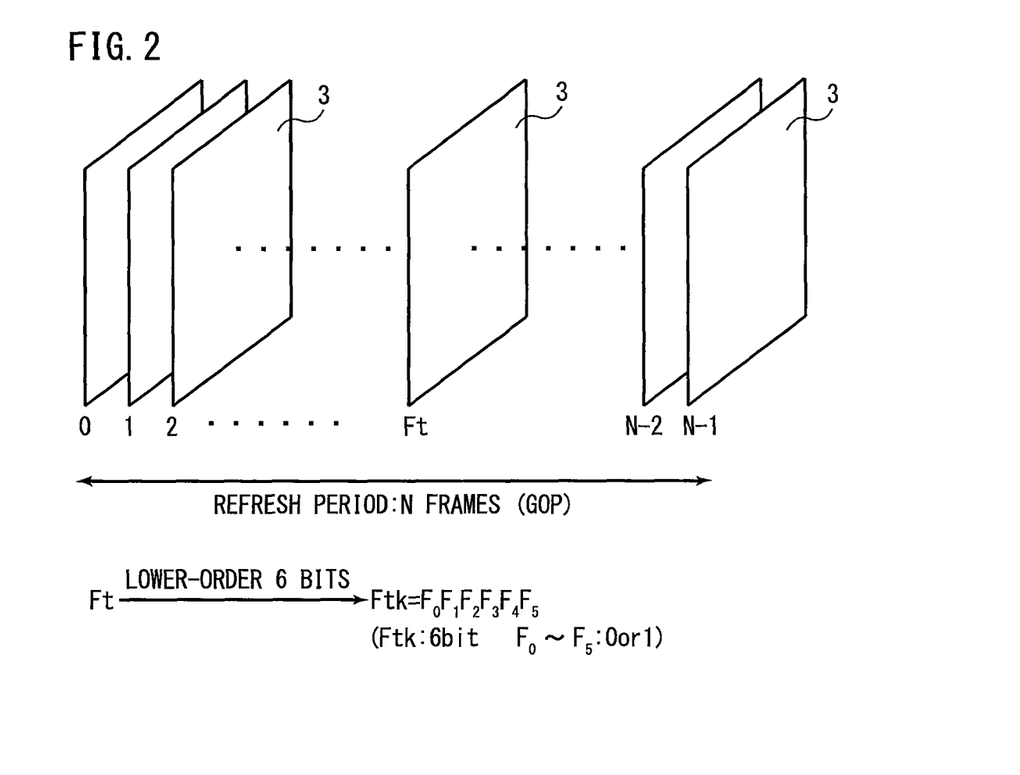
[FIG. 2] is a view showing frame numbers and a refresh period.

FIG. 2 shows frame images 3, 3 . . . , in the refresh period. Frame numbers from No. 0 to No. (N-1) are given to the frame images 3. The frame number of a coding object frame which is currently to be coded is "Ft". The frame number Ft is assumed to be represented by a binary number.

It is assumed that a numerical value of six bits which is generated by extracting the lower-order six bits of the frame number Ft is Ftk. As shown in FIG. 2, the numerical value Ftk is represented by a binary number, $F_0F_1F_2F_3F_4F_5$. $F_0$ to $F_5$ are each an integer of "0" or "1".

Figure 3:
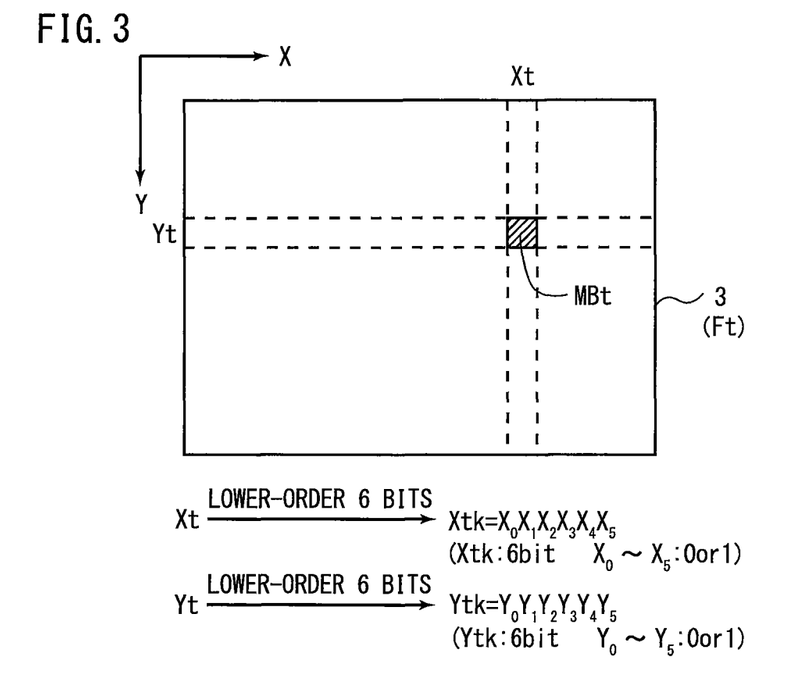
[FIG. 3] is a view showing the coordinates of a macroblock to be coded.

FIG. 3 is a view showing a coding object macroblock MBt disposed in the coding object frame. In the coding object frame, as shown in the figure, X axis and Y axis are defined. The X coordinate of the coding object macroblock MBt is Xt and the Y coordinate thereof is Yt. Xt and Yt are each represented by a binary number.

It is assumed that a numerical value of six bits, which is generated by extracting the lower-order six bits of the X coordinate Xt, is Xtk. As shown in FIG. 3, the numerical value Xtk is represented by a binary number, $X_0X_1X_2X_3X_4X_5$. $X_0$ to $X_5$ are each an integer of "0" or "1".

It is assumed that a numerical value of six bits, which is generated by extracting the lower-order six bits of the Y coordinate Yt, is Ytk. As shown in FIG. 3, the numerical value Ytk is represented by a binary number, $Y_0Y_1Y_2Y_3Y_4Y_5$. $Y_0$ to $Y_5$ are each an integer of "0" or "1".

Figure 4:
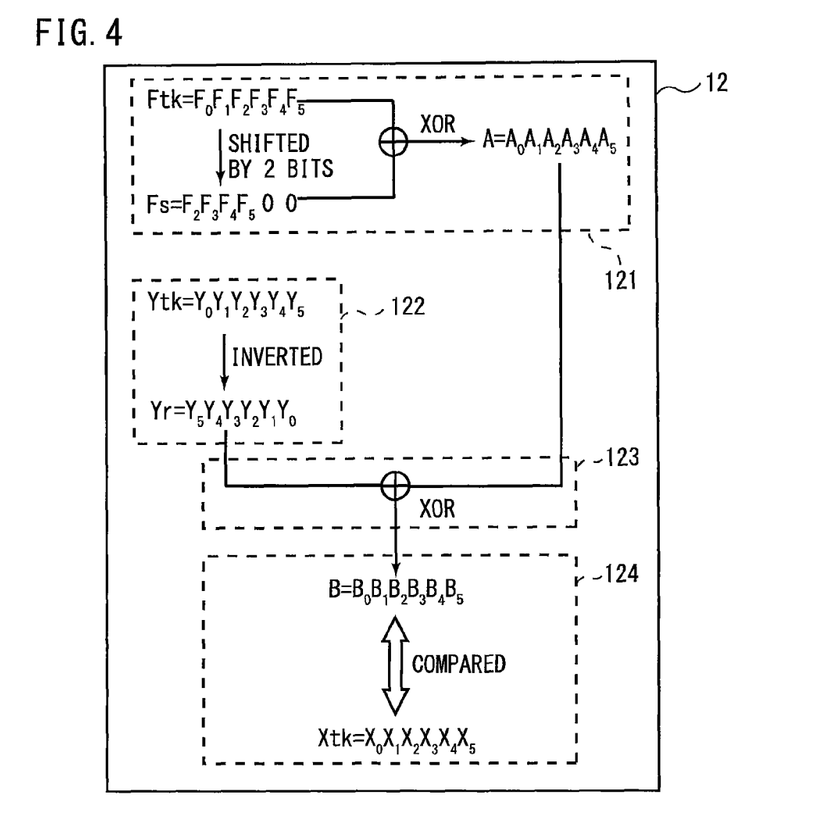
[FIG. 4] is a view showing an operation of a judgment part.

FIG. 4 is a view showing a judgment process performed by the judgment part 12. The judgment part 12 includes a first conversion part 121, a second conversion part 122, a generation part 123, and a determination part 124.

The first conversion part 121 generates a numerical value Ftk of six bits from the lower-order six bits of the frame number Ft. Further, the first conversion part 121 shifts the numerical value Ftk leftward by two bits, to thereby generate a numerical value Fs. The numerical value Fs is represented by a binary number, $F_2F_3F_4F_500$. The lower-order two bits which are vacant due to the left shift are filled with "00". Next, the first conversion part 121 calculates an exclusive OR of the numerical value Ftk and the numerical value Fs, to thereby generate a numerical value A of six bits. The numerical value A is represented by a binary number, $A_0A_1A_2A_3A_4A_5$. The numerical value A is a value of six bits. $A_0$ to $A_5$ are each an integer of "0" or "1". The numerical value Ftk can take one of 64 numerical values from 0 to 63. Therefore, the numerical value A which is the exclusive OR of the numerical value Ftk and the numerical value Fs can also take one of 64 numerical values from 0 to 63.

The operation performed by the first conversion part 121 may be generally described as follows. The frame number of a coding object frame including a macroblock to be coded in N frame period is represented by a binary number as a numerical value J (Ft in the above example). The first conversion part 121 extracts the lower-order K bits (the lower-order six bits in the above example) of the numerical value J, to thereby generate a numerical value L (Ftk in the above example) which can take a value of $2^K$. Further, the first conversion part 121 converts the numerical value L into a numerical value M (A in the above example) which can take a value of $2^K$.

In the first preferred embodiment, the first conversion part 121 shifts the numerical value L (Ftk in the above example) by V bits (two bits in the above example), to thereby generate a numerical value W (Fs in the above example), and calculates an exclusive OR of the numerical value L and the numerical value W to thereby generate the numerical value M (A in the above example).

The second conversion part 122 generates a numerical value Ytk of six bits from the lower-order six bits of the Y coordinate Yt of the coding object frame. Further, the second conversion part 122 inverts the upper-order bits of the numerical value Ytk and the lower-order bits thereof, to thereby generate a numerical value Yr of six bits. The numerical value Yr is represented by a binary number, $Y_5Y_4Y_3Y_2Y_1Y_0$. The numerical value Ytk can take one of 64 numerical values from 0 to 63. Therefore, the numerical value Yr which is generated by inverting the upper-order bits of the numerical value Ytk and the lower-order bits thereof can also take one of 64 numerical values from 0 to 63.

The operation performed by the second conversion part 122 may be generally described as follows. Assuming that the coordinate (the Y coordinate in the above example) of the macroblock to be coded in a first direction in the coding object frame is represented by a binary number as a numerical value P (Yt in the above example), the lower-order K bits (six bits in the above example) of the numerical value P is extracted, to thereby generate a numerical value Q (Ytk in the above example) which can take a value of $2^K$ and the numerical value Q is converted into a numerical value R (Yr in the above example) which can take a value of $2^K$.

In the first preferred embodiment, the second conversion part 122 inverts the upper-order bits of the numerical value Q (Ytk in the above example) and the lower-order bits thereof, to thereby generate the numerical value R (Yr in the above example).

The generation part 123 calculates an exclusive OR of the numerical value Yr and the numerical value A, to thereby generate a numerical value B of six bits. The numerical value B is represented by a binary number, $B_0B_1B_2B_3B_4B_5$. The numerical value B is a value of six bits. $B_0$ to $B_5$ are each an integer of "0" or "1".

The operation performed by the generation part 123 may be generally described as follows. The generation part 123 generates a numerical value S (B in the above example) which is uniquely determined from a combination of the numerical value M (A in the above example) and the numerical value R (Yr in the above example).

In the first preferred embodiment, the generation part 123 calculates an exclusive OR of the numerical value M (A in the above example) and the numerical value R (Yr in the above example), to thereby generate the numerical value S (B in the above example).

The determination part 124 extracts the lower-order six bits of the X coordinate Xt of the macroblock to be coded, to thereby generate a numerical value Xtk of six bits.

The determination part 124 compares the numerical value Xtk with the numerical value B. The binary numerical value Xtk is represented as $X_0X_1X_2X_3X_4X_5$. $X_0$ to $X_5$ are each an integer of "0" or "1". When the numerical value Xtk and the numerical value B are identical to each other, the determination part 124 determines the macroblock to be coded as an intra macroblock. In other words, the determination part 124 determines to intra-code a macroblock having an X coordinate of Xt and a Y coordinate of Yt in the Ft-th frame.

The operation performed by the determination part 124 may be generally described as follows. Assuming that the coordinate of the macroblock to be coded in a second direction (the X-axis direction in the above example) orthogonal to the first direction (the Y-axis direction in the above example) in the coding object frame is represented by a binary number as a numerical value T (Xt in the above example), the lower-order K bits (six bits in the above example) of the numerical value T is extracted, to thereby generate a numerical value U (Xtk in the above example) which can take a value of $2^K$, and when the numerical value S (B in the above example) and the numerical value U (Xtk in the above example) are identical to each other, the macroblock to be coded is determined as an intra macroblock.

Since the image coding apparatus of the first preferred embodiment has the above construction, the intra macroblocks are dispersed in the refresh period. In the image coding apparatus 1 of the first preferred embodiment, the first conversion part 121, the second conversion part 122, and the generation part 123 randomly convert the frame number Ft and the Y coordinate Yt, to thereby generate the numerical value B. Then, the determination part 124 compares the numerical value Xtk which is part of the X coordinate with the numerical value B. Therefore, the X coordinate of the intra macroblock has no predictivity, and the positions of the intra macroblocks to be arranged can be randomely dispersed.

The macroblocks in one frame are intra-coded once in the refresh period (N frames), provided that N is represented by a power of 2. In some cases, the number of macroblocks in the X-axis direction of an image included in one frame is not a power of 2. It is assumed, for example, that the number of macroblocks in the X-axis direction of an image included in one frame is 60 and the refresh period is $2^6=64$. In this case, the numerical value B can take a value ranging from 0 to 63 and the numerical value Xtk can take a value ranging from 0 to 59. Therefore, with respect to one slice line, no intra macroblock exists in each of four frames among the 64 frames. Even in such a case, the intra macroblocks are dispersed in the refresh period. When the number of macroblocks in the X-axis direction of an image included in one frame is not a power of 2, the least power of 2 which is larger than the number of macroblocks in the X-axis direction should be the refresh period N. The refresh period depends on the number of bits of the numerical value Ftk, Xtk, or Ytk. In the above example, since the numerical value Ftk, Xtk, or Ytk is a value of six bits, the refresh period is $2^6=64$.

Figure 5:
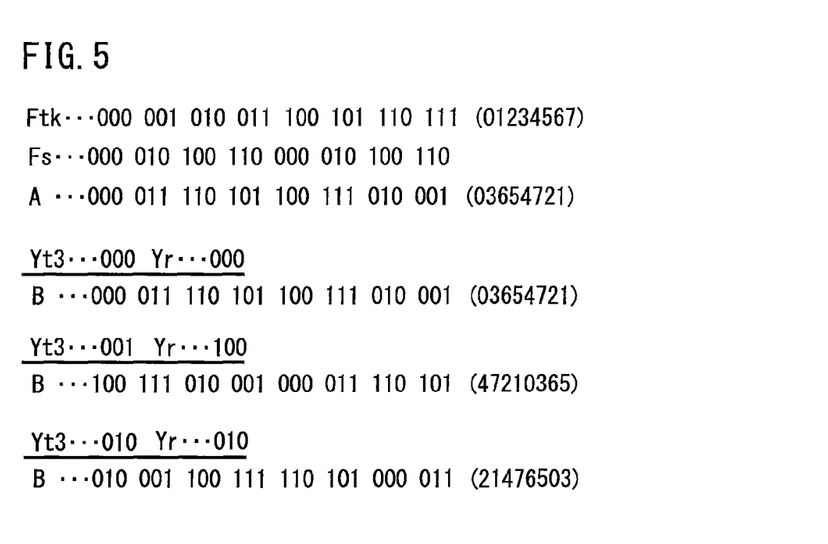
[FIG. 5] is a view showing an example of numerical values to be processed by the judgment part.

FIG. 5 is a view showing the operation of the judgment part 12 in the first preferred embodiment, by employing actual numerical values. The numerical values Ftk are generated by extracting the lower-order three bits of the frames Ft. Eight numerical values (000, 001, 010 . . . ) which are the numerical values Ftk in binary representation are shown in the figure. The numerical values Ftk in decimal representation are shown in parentheses. The numerical values Ftk in decimal representation are values ranging from 0 to 7 in ascending order, such as 0, 1, 2, 3, 4, 5, 6, 7.

The numerical values Fs obtained by shifting the numerical values Ftk leftward by one bit are such values (000, 010, 100 . . . ) as shown. The lower-order bit which is vacant due to the left shift is filled with "0". The exclusive ORs of the eight numerical values Ftk and the eight numerical values Fs are calculated, to thereby obtain the numerical values A (000, 011, 110 . . . ) as shown in FIG. 5. The numerical values A in decimal representation are 0, 3, 6, 5, 4, 7, 2, 1. In other words, the lower-order three bits of the frame numbers are interchanged at random. It can be also seen that the numerical values A take all the values from 0 to 7.

In FIG. 5, three Y coordinates are shown. The numerical value Yt3 which is the lower-order three bits of the first Y coordinate is "000". The numerical value Yr obtained by inverting the upper-order bit and the lower-order bit is "000". When the numerical value Yr is "000", the numerical values B obtained by calculating the exclusive OR of the numerical values A and the numerical value Yr are such values (000, 011, 110 . . . ) as shown. The numerical values B in decimal representation are 0, 3, 6, 5, 4, 7, 2, 1.

The numerical value Yt3 which is the lower-order three bits of the second Y coordinate is "001". The numerical value Yr obtained by inverting the upper-order bit and the lower-order bit is "100". When the numerical value Yr is "100", the numerical values B obtained by calculating the exclusive OR of the numerical values A and the numerical value Yr are such values (100, 111, 010 . . . ) as shown. The numerical values B in decimal representation are 4, 7, 2, 1, 0, 3, 6, 5.

The numerical value Yt3 which is the lower-order three bits of the third Y coordinate is "010". The numerical value Yr obtained by inverting the upper-order bit and the lower-order bit is "010". When the numerical value Yr is "010", the numerical values B obtained by calculating the exclusive OR of the numerical values A and the numerical value Yr are such values (010, 001, 100 . . . ) as shown. The numerical values B in decimal representation are 2, 1, 4, 7, 6, 5, 0, 3.

When the numerical value B which is thus calculated and the lower-order three bits of the X coordinate are identical to each other, the macroblock to be coded is intra-coded. With reference to the numerical values B shown in FIG. 5, it can be seen that the respective X coordinates of the intra macroblocks are randomly disposed. Further, with the different Y coordinates, the X coordinates are also randomly changed. Therefore, the intra macroblocks are randomly disposed in each frame, and the image quality can be improved.

{The Second Preferred Embodiment}

In the first preferred embodiment, it is discussed that N indicating the refresh period is a power of 2. It is also discussed that when the number of macroblocks in the X-axis direction in one frame is not a power of 2, the least power of 2 which is larger than the number of macroblocks in the X-axis direction should be the refresh period N.

When there is a large difference between the number of macroblocks in the X-axis direction and powers of 2, however, this is not preferable because the refresh period will be longer than needed. When the number of macroblocks in the X-axis direction is 129, for example, the least power of 2 which is larger than 129 is $2^8=256$. Specifically, the refresh period is 256 frames. In the refresh period of 256 frames, with respect to one slice line, 129 frames have intra macroblocks but the remaining 127 frames have no intra macroblock. When the refresh period becomes longer, this causes degradation in image quality.

Then, in the second preferred embodiment, an image of one frame is divided into a plurality of areas and the judgments on the intra macroblocks are performed for the plurality of areas concurrently.

Figure 6:
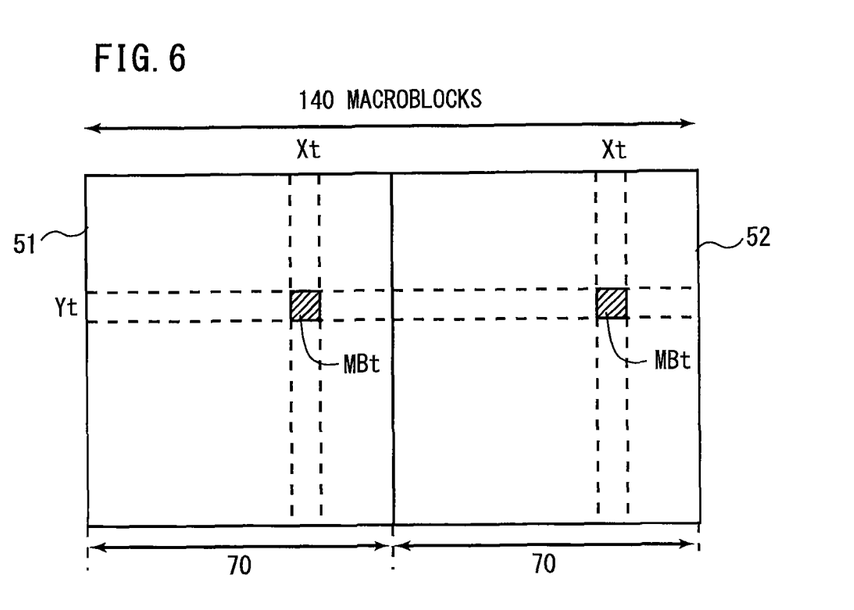
[FIG. 6] is a view showing areas into which a frame is divided in accordance with a second preferred embodiment.

FIG. 6 is a view showing an exemplary case where the number of macroblocks in the X-axis direction is 140. If the least power of 2 which is larger than 140 is determined as the refresh period like in the first preferred embodiment, the refresh period is 256 frames, which is very long.

As shown in FIG. 6, the coding part 11 divides a frame image into two areas 51 and 52 each having 70 macroblocks in the X-axis direction. The coding part 11 specifies respective coding object macroblocks for the two areas 51 and 52.

The judgment part 12 acquires information on two coding object macroblocks from the coding part 11. The judgment part 12 performs the same operation as that in the first preferred embodiment to judge whether each of the coding object macroblocks should be intra-coded or inter-coded. The X coordinate and the Y coordinate of the coding object macroblock, however, are those in each of the areas 51 and 52. In other words, the same operation as that in the first preferred embodiment is performed for the frame image having 70 macroblocks in the X-axis direction. The operation is performed for the two areas 51 and 52 concurrently.

Thus, by dividing the frame into a plurality of areas, it is possible to make the refresh period shorter. In the exemplary case of FIG. 6, the refresh period is 128 equal to the least power of 2 which is larger than 70 which is the number of macroblocks in the X-axis direction.

{The Third Preferred Embodiment}

In the second preferred embodiment, it is possible to make the refresh period shorter. In the second preferred embodiment, however, the intra macroblocks in the two areas exhibit the same pattern.

Figure 7:
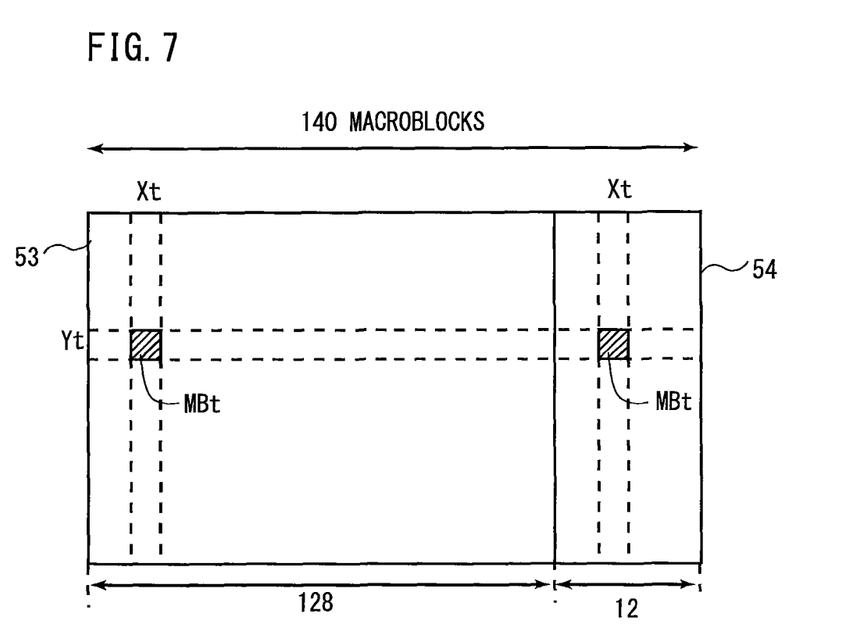
[FIG. 7] is a view showing areas into which a frame is divided in accordance with a third preferred embodiment.

In the third preferred embodiment, as shown in FIG. 7, among two areas 53 and 54, in one area 53, the number of macroblocks in the X-axis direction is 128 which is a power of 2. In the other area 54, the number of macroblocks in the X-axis direction is 12 which is obtained by subtracting 128 from 140. By adopting such division, it is possible to reduce the frequency in which the intra macroblocks in the two areas exhibit the same pattern.

In the area 53 where the number of macroblocks in the X-axis direction is 128 which is a power of 2, the refresh period is 128 frames. With respect to one slice line, one macroblock is necessarily selected as the intra macroblock in each of the 128 frames. Also in the area 54 where the number of macroblocks in the X-axis direction is 12, the refresh period is 128 frames. With respect to one slice line, one macroblock is selected as the intra macroblock in each of the 12 frames during the refresh period. In the remaining 116 frames during the refresh period, however, there is no intra macroblock.

In the 12 frames where the intra macroblocks occur in the area 54, the intra macroblocks in the two areas 53 and 54 exhibit the same pattern. In the remaining 116 frames, however, the intra macroblocks occur only in the area 53. Therefore, the period in which the intra macroblocks in the two areas 53 and 54 exhibit the same pattern becomes very shorter, and this improves the image quality.

{The Fourth Preferred Embodiment}

In the second and third preferred embodiments, an image in one frame is divided into two areas. This is only one exemplary case and the image in one frame may be divided into three or more areas.

Figure 8:
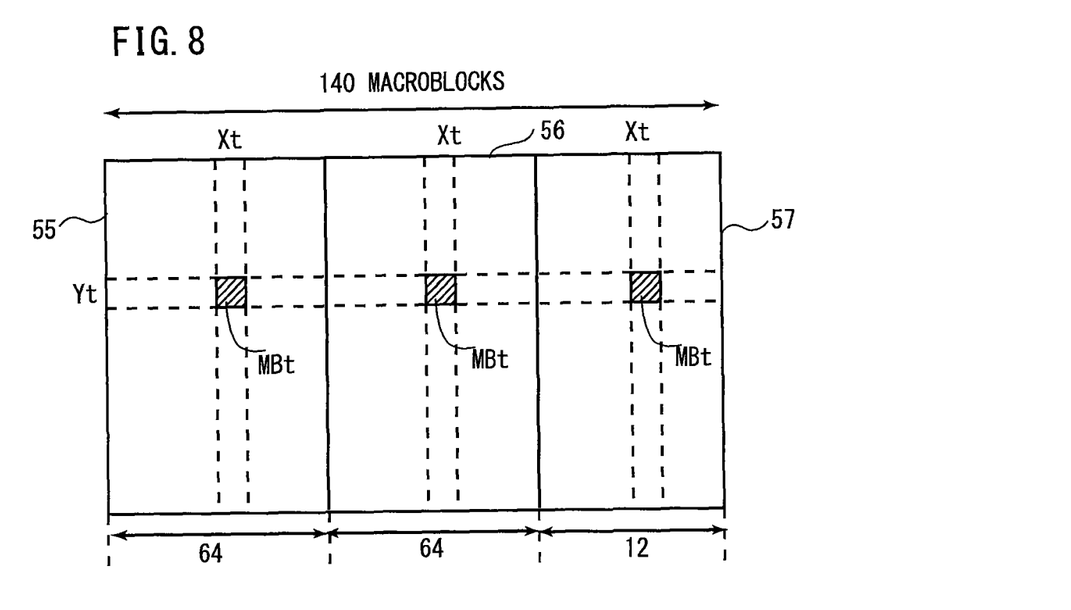
[FIG. 8] is a view showing areas into which a frame is divided in accordance with a fourth preferred embodiment.

FIG. 8 is a view showing an exemplary case where an image in one frame is divided into three areas. As shown in FIG. 8, the coding part 11 divides the frame image into three areas 55, 56, and 57 where the respective numbers of macroblocks in the X-axis direction are 64, 64, and 12. The coding part 11 specifies respective coding object macroblocks for the three areas 55, 56 and 57.

The judgment part 12 acquires information on three coding object macroblocks from the coding part 11. The judgment part 12 performs the same operation as that in the first preferred embodiment to judge whether each of the coding object macroblocks should be intra-coded or inter-coded. In the exemplary case of FIG. 8, the refresh period is 64.

Though the method for dividing the frame image into a plurality of areas is not specifically limited, such a dividing method as discussed below is effective. It is assumed that the number of macroblocks in the X-axis direction of the frame image to be coded is D. A power of 2, which is represented as E, is selected out of the powers of 2 which are not larger than D. Assuming that the quotient of D divided by E is G areas each having E macroblocks in the X-axis direction and one area having (D - E * G) macroblocks in the X-axis direction may be set. When there is no remainder of division of D by E, G areas each having E macroblocks in the X-axis direction may be set as a plurality of areas.

{The Fifth Preferred Embodiment}

In the second, third, and fourth preferred embodiments, the same operation is performed to determine the intra macroblocks in each of the divided areas. Therefore, the intra macroblocks in the different areas exhibit the same pattern as observed in a time direction.

In the fifth preferred embodiment, the intra macroblocks in the different areas are determined by performing different operations. Therefore, as observed in a time direction, the intra macroblocks in the different areas exhibit different patterns.

In order to perform different operations for the different areas, the first conversion part 121 uses different values as the frame number Ft for the different areas.

Figure 9:
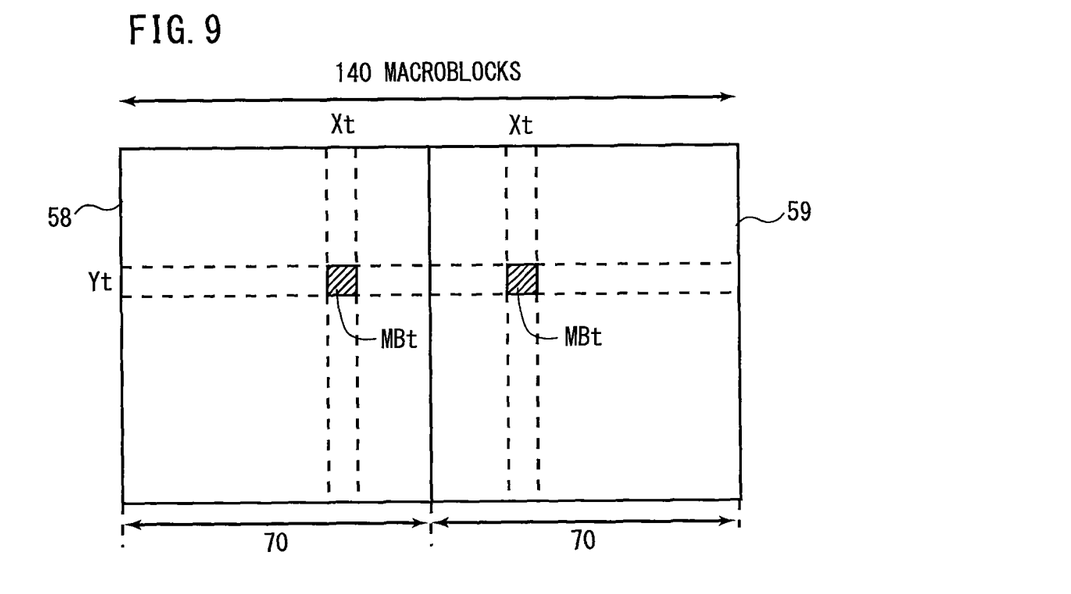
[FIG. 9] is a view showing areas into which a frame is divided in accordance with a fifth preferred embodiment.

FIG. 9 is a view showing an exemplary case where an image in one frame is divided into two areas 58 and 59. When the operation shown in FIG. 4 is performed, the correct frame number Ft is used for the area 58. On the other hand, a value different from the current frame number Ft is used for the area 59. For example, a value obtained by adding 1 to Ft may be used. Another value obtained by interchanging the bits of Ft may be used. While the numerical value Ftk in the area 58 takes a value ranging from 0 to (N-1), the numerical value Ftk in the area 59 takes a value also ranging from 0 to (N-1), which is different from the value of Ftk in the area 58. Thus, different numerical values B are obtained by calculation in the areas 58 and 59 even with respect to the same frame and the same Y coordinate. Since the intra macroblocks in the areas 58 and 59 exhibit different patterns, the intra macroblocks can be more randomly disposed.

In a case where one frame image is divided into three areas like in the fourth preferred embodiment, different values for the respective frame numbers Ft in the three areas have only to be used. There may be a case, for example, where the frame number Ft is used in the area 55, a value obtained by adding 1 to Ft is used in the area 56, and a value obtained by adding 2 to Ft is used in the area 57. All the plurality of areas may use different values for Ft, or only some of the areas may use different values for Ft.

In the above-discussed preferred embodiments, randomized numerical values B are generated from the frame number Ft and the Y coordinates Yt by using the first conversion part 121, the second conversion part 122, and the generation part 123. The operation of the first conversion part 121, the second conversion part 122, and generation part 123 in the above-discussed preferred embodiments is only one example. For example, the operation of the first conversion part 121 and that of the second conversion part 122 may be interchanged. Further, in the above-discussed preferred embodiments, randomized numerical values B are generated from the frame number and the Y coordinates and the numerical values B are compared with the X coordinate. As another preferred embodiment, there may be a case where randomized numerical values B are generated from the frame number and the X coordinates and the numerical values B are compared with the Y coordinate.

In the above-discussed preferred embodiments, the first conversion part 121, the second conversion part 122, the generation part 123, and the determination part 124 are implemented by hardware. The first conversion part 121, the second conversion part 122, the generation part 123, and the determination part 124, however, may be implemented by a CPU and a program operating on the CPU.

While the invention has been shown and described in detail, the foregoing description is in all aspects illustrative and not restrictive. It is therefore understood that numerous modifications and variations can be devised without departing from the scope of the invention.

The invention claimed is:

1. An image coding apparatus, comprising:
a judgment part for judging whether a macroblock to be coded should be intra-coded or inter-coded so that all macroblocks are intra-coded once in N frame period; and
a coding part for coding said macroblock to be coded, on the basis of a determination result of said judgment part,
wherein said judgment part includes
a first conversion part for extracting the lower-order K bits of a numerical value J to thereby generate a numerical value L which can take a value of $2^K$ and converting said numerical value L into a numerical value M which can take a value of $2^K$, assuming that a frame number of a coding object frame including said macroblock to be coded in said N frame period is represented by a binary number as said numerical value J;
a second conversion part for extracting the lower-order K bits of a numerical value P to thereby generate a numerical value Q which can take a value of $2^K$ and converting said numerical value Q into a numerical value R which can take a value of $2^K$, assuming that the coordinate of said macroblock to be coded in a first direction in said coding object frame is represented by a binary number as said numerical value P;
a generation part for generating a numerical value S which is uniquely determined from a combination of said numerical value M and said numerical value R; and
a determination part for extracting the lower-order K bits of a numerical value T to thereby generate a numerical value U which can take a value of $2^K$ and determining said macroblock to be coded as an intra macroblock when said numerical value S and said numerical value U are identical to each other, assuming that the coordinate of said macroblock to be coded in a second direction orthogonal to said first direction in said coding object frame is represented by a binary number as said numerical value T.

2. The image coding apparatus according to claim 1, wherein
said first direction is either of an X-axis direction and a Y-axis direction in said coding object frame.

3. The image coding apparatus according to claim 1, wherein
said first conversion part shifts said numerical value L by V bits, to thereby generate a numerical value W, and calculates an exclusive OR of said numerical value L and said numerical value W, to thereby generate said numerical value M.

4. The image coding apparatus according to claim 1, wherein
said second conversion part inverts an upper-order bit and a lower-order bit/upper-order bits and lower-order bits of said numerical value Q, to thereby generate said numerical value R.

5. The image coding apparatus according to claim 1, wherein
said generation part calculates an exclusive OR of said numerical value M and said numerical value R, to thereby generate said numerical value S.

6. The image coding apparatus according to claim 1, wherein
said N is represented by a power of 2.

7. An image coding apparatus, comprising:
a judgment part for judging whether a macroblock to be coded should be intra-coded or inter-coded so that all macroblocks are intra-coded once in N frame period; and
a coding part for dividing a coding frame into a plurality of areas, and coding a macroblock to be coded in each of said plurality of areas, on the basis of a determination result of said judgment part,
wherein said judgment part includes
a first conversion part for extracting the lower-order K bits of a numerical value J to thereby generate a numerical value L which can take a value of $2^K$ and converting said numerical value L into a numerical value M which can take a value of $2^K$, assuming that a frame number of said coding object frame in said N frame period is represented by a binary number as said numerical value J;
a second conversion part for extracting the lower-order K bits of a numerical value P to thereby generate a numerical value Q which can take a value of $2^K$ and converting said numerical value Q into a numerical value R which can take a value of $2^K$, assuming that the coordinate of said macroblock to be coded in a first direction in said each area is represented by a binary number as said numerical value P;

a generation part for generating a numerical value S which is uniquely determined from a combination of said numerical value M and said numerical value R; and a determination part for extracting the lower-order K bits of a numerical value T to thereby generate a numerical value U which can take a value of $2^K$ and determining said macroblock to be coded as an intra macroblock when said numerical value S and said numerical value U are identical to each other, assuming that the coordinate of said macroblock to be coded in a second direction orthogonal to said first direction in said each area is represented by a binary number as said numerical value T.

8. The image coding apparatus according to claim 7, wherein said coding part selects a power of 2, which is represented as E, out of powers of 2 which are not larger than the number D of macroblocks in said second direction in said coding object frame, and sets G areas each having E macroblocks in said second direction, which correspond to some or all of said plurality of areas, assuming that the quotient of D divided by E is G.

9. The image coding apparatus according to claim 8, wherein said coding part sets G areas each having E macroblocks in said second direction and one area having (D - E * G) macroblocks in said second direction, as said plurality of areas, when there is a remainder of division of D by E.

10. The image coding apparatus according to claim 7, wherein said first conversion part uses a numerical value different from said numerical value J as said frame number for some or all of said plurality of areas.

11. The image coding apparatus according to claim 7, wherein said first direction is either of an X-axis direction and a Y-axis direction in said coding object frame.

12. The image coding apparatus according to claim 7, wherein said first conversion part shifts said numerical value L by V bits, to thereby generate a numerical value W, and calculates an exclusive OR of said numerical value L and said numerical value W, to thereby generate said numerical value M.

13. The image coding apparatus according to claim 7, wherein said second conversion part inverts an upper-order bit and a lower-order bit/upper-order bits and lower-order bits of said numerical value Q, to thereby generate said numerical value R.

14. The image coding apparatus according to claim 7, wherein said generation part calculates an exclusive OR of said numerical value M and said numerical value R, to thereby generate said numerical value S.

15. The image coding apparatus according to claim 7, wherein said N is represented by a power of 2.

* * * * *